July 11, 1967

W. O. DOTY 3,329,980

LAND-WATER VEHICLE

Filed Jan. 21, 1966

INVENTOR:
WILLIAM O. DOTY

BY Gravely, Lieder & Woodruff

ATTORNEYS.

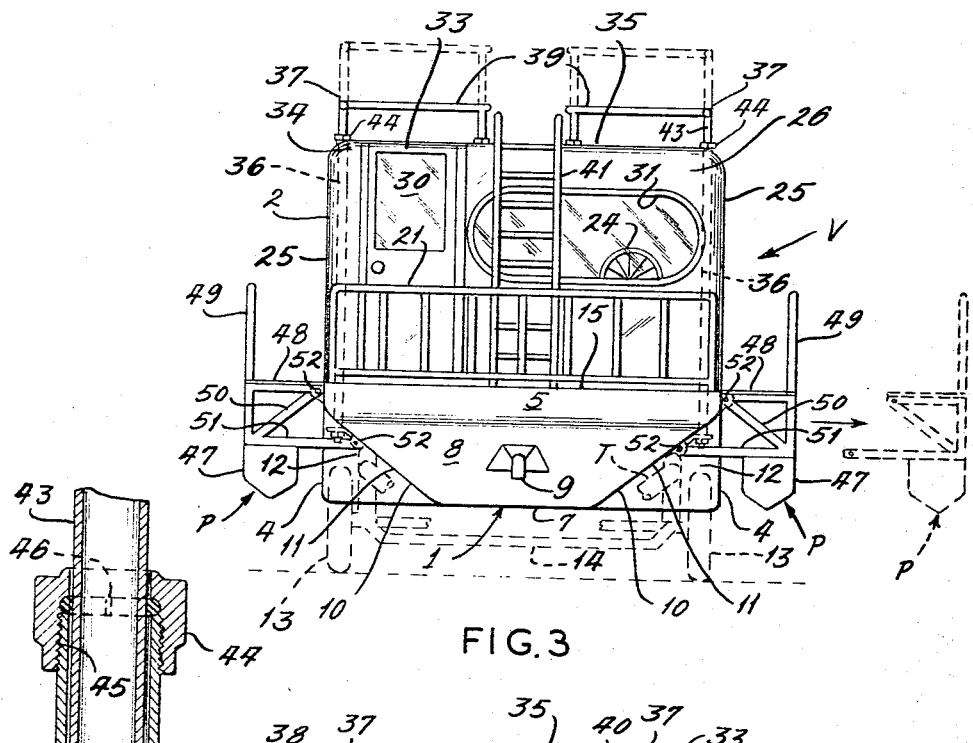

United States Patent Office 3,329,980
Patented July 11, 1967

3,329,980
LAND-WATER VEHICLE
William O. Doty, 406 Smedeker Ave.,
Jerseyville, Ill. 62052
Filed Jan. 21, 1966, Ser. No. 522,183
10 Claims. (Cl. 9—1)

ABSTRACT OF THE DISCLOSURE

A land-water vehicle having a hull construction which can be removably secured to a trailer having wheels thereon and which slips into the water without the wheels, said hull construction having novel means for attaching the trailer and pontoons thereto, including novel connectors.

This invention relates to an improved land-water vehicle, and in particular, to a land-water vehicle which can be pulled by an automobile to be used on land when hunting, fishing or camping, or can be used in water for fishing.

At present, there are so-called amphibious house trailers or vehicles which are adapted to be transported on a trailer pulled by an automobile and placed into the water, either with the trailer thereon or removed therefrom. However, these devices have numerous objections. It is not good to place the trailer and wheels into water, especially salt water which tends to deteriorate their parts. Such devices are not full width and frequently require pontoons which are difficult or inconvenient to install in their floating position.

One of the principal objects of the present invention is to provide a land-water vehicle or trailer which is as wide as possible for stability in the water and room inside the cabin and still within the legal limits to be transportable on a trailer pulled by an automobile on the highway. Another object is to provide a hull which is full width at the rear, but shaped along the outer front portions to fit conveniently on a wheeled carriage or trailer. Another object is to provide a hull which is adapted to receive pontoons which are carried on the roof of the cabin. Another object is to provide fittings which can be used to hold the cabin to the wheeled carriage, and also, to receive the removable pontoons. Another object is to provide a cabin door which has a curved top portion to give sufficient head room. Another object is to provide a cabin which can be used on the water for outings, fishing, and swimming, and which also can be used on land for vacations, camping, hunting, and fishing and which can be prepared for use at one's leisure and cleaned up after a weekend of use at one's leisure.

These and other objects will become apparent hereinafter.

The present invention is embodied in a land-water vehicle having a new design, said trailer having a hull which is full width with cut-out portions along the front edges thereof for receiving wheels on a trailer, said hull having a cabin thereon, said cabin having one or more cabin doors whose top portion is curved, removable pontoons which are stored on the roof of said cabin, said pontoons being attached to the hull on the same fittings which are used to attach the hull to the trailer.

Figure 1:
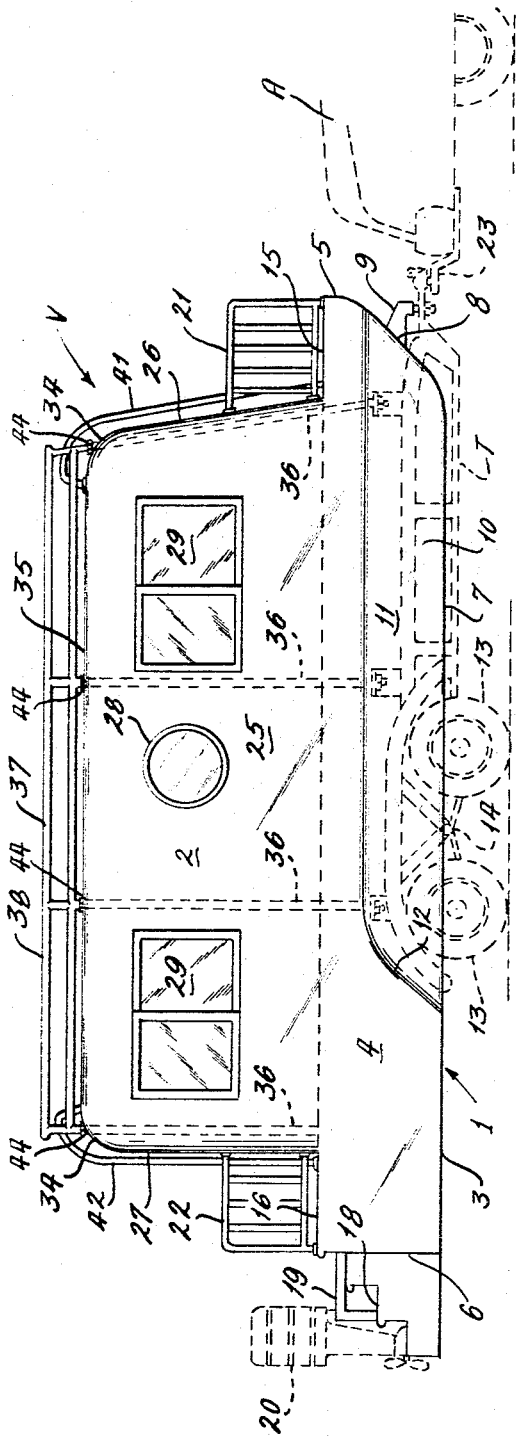
Figure 2:
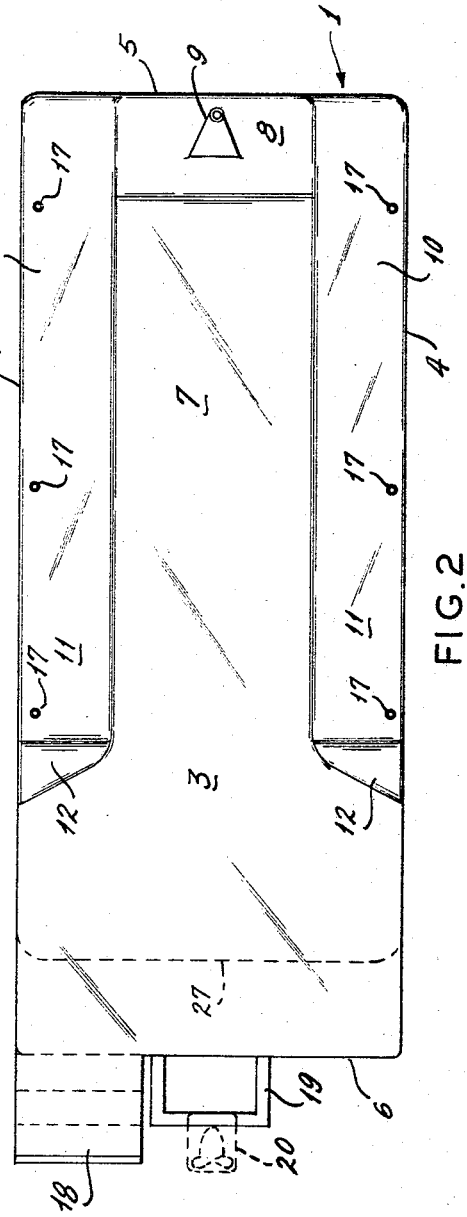

The invention also consists in the parts and in the arrangements and combinations of parts hereinafter described and claimed. In the accompanying drawings which form part of this specification and wherein like numerals and letters refer to like parts wherever they occur:

FIG. 1 is a side elevational view of a hull and cabin embodying my invention, with the trailer and part of an automobile shown in dotted lines, FIG. 2 is a bottom view of the hull with the stairs and motor attached, FIG. 3 is a front elevational view showing the pontoons in their stabilizing position after being removed from the roof of the cabin, FIG. 4 is a rear elevational view showing the pontoons and trailer wheels in dotted lines, FIG. 5 is an enlarged view of a fitting used to position the side rails on the roof deck in their upper and lower positions, FIG. 6 is an enlarged view of a fitting used to maintain the cabin and hull on the trailer, FIG. 7 is a sectional view along the line 7—7 of FIG. 6, and FIG. 8 is a perspective view of the bolt used to secure the parts together.

Referring now to the drawings in detail, it will be seen that the embodiment of the invention which has been illustrated comprises a land-water vehicle V adapted to be carried on a trailer T and pulled by a prime mover, such as an automobile A. The vehicle V comprises a hull 1 with a cabin 2 mounted thereon.

The hull 1 comprises a bottom 3, two side walls 4, a front wall 5, and a rear wall 6. The hull 1 has a flat forward central portion 7 which has a sloping forward portion 8 with a connector 9 thereon. The hull 1 has two long cut-out portions 10 along the forward lower edges thereof formed by the sloping portions 11 and the triangular section 12. The cut-out portions 10 are adapted to receive the wheels 13 of the trailer T. The wheels 13 are connected by an axle 14 which extends under the hull 1. The hull 1 is full width throughout its length and is as wide as possible within the legal limits of trailers which can be transported on the highway. At present, this width is 8 feet without a permit, but 10 feet with a permit which is readily obtainable in most states. The length of the hull 1 may vary as desired, but about 20 to 40 feet is preferable.

The hull 1 has a forward deck 15 and a rear deck 16, each of which is about 18″ wide. The sloping surface 11 has fittings or openings 17 therein for receiving the connections on the trailer T and the pontoons P. The rear 6 of the hull 1 is adapted to receive stairs 18 and is provided with a motor mounting 19 adapted to receive an outboard motor 20. The forward deck 15 and rear deck 16 are provided with suitable hand rails 21 and 22. The stairs 18 and motor mounting 19 are adapted to be folded upwardly onto the rear deck 16 when the vehicle V is being transported on land. The connector 9 on the sloping front wall 8 is adapted to receive a trailer hitch 23 mounted at the rear of the automobile A.

The hull 1 has a steering wheel 24 mounted thereon with steering linkage extending rearwardly and adapted to be connected with said outboard motor 20 so that the vehicle V may be steered in the water by said steering wheel 24 which actuates the rudder of the outboard motor 20. The floor surface of the hull 1 within the cabin 2 is below the level of the forward deck 15 and rear deck 16.

When the cabin 2 is positioned on the wheel carriage or trailer T as show in FIG. 1, the cabin 2 is substantially centered over said wheels 13 so as to be in substantial balance when the automobile A is unhitched. This balance takes the weight off of the towing automobile A and allows the cabin 2 to remain level on the wheels 13 with only slight support when the cabin 2 is used or stored on land.

The cabin 2 has two side walls 25, a sloping front wall 26, and a rear wall 27 which may slope if desired. The side walls 25 are provided with a porthole 28 and windows 29, as desired. The sloping front wall 26 is provided with a sliding door 30 and window 31. The rear wall 27 is provided with a similar door 32 and window 32a. Each sliding door 30 and 32 has a curved upper portion 33 adapted to slide in the curved upper corners 34 of the cabin 2. The cabin 2 has a roof deck 35 which is flat and is supported by a plurality of poles 36 which extend upwardly from the hull 1. The roof deck 35 has a suitable guard rail 37 formed by side railings 38, front railings 39, and rear railings 40. A front ladder 41 and rear ladder 42 are provided, as desired, for access to the roof deck 35. The side walls 25 extend upwardly from the hull sides 4 so that the cabin 2 will be as wide as possible on the inside. The side walls 25 may have inner side walls thereon so that the poles 36 which support the roof deck 35 are not visible from the inside or the outside.

The guard rail 37 on the roof deck 35 is provided with vertical supports 43 and can be raised or lowered and maintained in either position. This is accomplished by means of couplings 44 shown in FIG. 5, each of which receives a vertical support 43 therein. Along the side walls 25, the vertical supports 43 are mounted in the poles 36, which extend slightly above the level of the roof deck 35 so as to have a coupling 44 exposed which can be rotated on the threads 45 to squeeze a washer 46 to maintain the supports 43 in fixed position in the poles 36. Loosening the coupling 44 releases pressure on the washer 46 so that the guard rail 37 may be fixed in a low position for traveling or at any desired elevated position when the roof deck 35 is in use.

Pontoons P are provided along the side walls 25 to add or aid stability in the water and provide for additional deck space. Each pontoon has a float 47 which may be made from Styrofoam or made in the form of a hollow compartment formed of metal, such as aluminum. Each pontoon P has a side deck 48 above the float 47 with a side rail 49 thereon. The side deck 48 is spaced from the float 47 by a brace 50. A bracket 51 extends in parallel relation to the side deck 48. The inner ends of the side deck 48 and brackets 51 are provided with connectors or openings 52. These connectors may be suitably attached to fittings on the roof deck 35 when the vehicle V is transported on land and to the fittings on the hull 1 when the vehicle is in the water so that the pontoons are rigidly attached. The connectors 52 are attached to the same hull openings or fittings 17 which are used to attach the trailer T to the vehicle V when it is being transported.

The opening or fitting 17 is best shown in FIG. 6 wherein the fitting may comprise the lower portion of the pole 36, in which is mounted a plug 53 having a slot 54 therein. A bolt 55 with a shank 56 and a T-head 57 is adapted to be inserted into the slot 54 and then turned 90° so that the T-head 57 fits into a cross groove 58 in the top of the plug 53. A nut 59 may then be screwed onto the threaded portion 60 of the shank 55 with the connector of the pontoon P or trailer T between the nut 59 and the hull 1 or the bottom of the pole 36 which extends to the hull surface. Only a simple wrench is necessary to tighten and loosen the nut 59.

In the water, the cabin 2 is given greater stability by attaching the pontoons P. The side decks 48 together with the front deck 15 and rear deck 16 form a continuous deck about 18" wide completely around the outside of the cabin 2, which enables persons to move from the front deck 15 to the rear deck 16 without going through the inside of the cabin 2. This is desirable in many instances, such as when fishing. The sliding doors 30 and 32 have curved upper portions to give more headroom or access from the deck into the cabin 2, whose roof is elevated sufficiently from the floor to permit persons of average height to move around comfortably but is not so high as to limit the movement of the vehicle on its trailer on the highways. Each sliding door is movable out of the plane of the wall so that it can be slid in parallel relation to the inner portion of the walls. This avoids swinging doors and saves space that would otherwise be wasted within the cabin or on the deck.

Both front and rear doors are identical except for the knob which is at opposite sides of the door. The hull 1 is provided with three fittings or openings 17 along each side so that the hull may receive and be attached to either the trailer T or pontoons P at three places along each side. If exceptionally long cabins 2 are desired, the trailer T may be provided with three wheels along each side instead of the two wheels, as shown, and additional poles or struts 36 may be provided.

The struts or poles 36 have been shown extending the full height of the cabin 2. These poles 36 support the roof deck 35, provide the sockets for the movable roof deck rails, and provide the opening for the plugs 53 which receive the bolts 55 and nuts 59 which secure the hull 1 to either the pontoons P or the trailer T.

This invention is intended to cover all changes and modifications of the example of the invention herein chosen for purposes of the disclosure, which do not constitute departures from the spirit and scope of the invention.

What is claimed is:

1. In a land-water vehicle adapted to be removably secured to a trailer having wheels thereon, a substantially flat hull which is full width at the rear and which has cut-out portions along the lower forward edges extending more than half of the length of said hull, said cut-out portions adapted to receive said trailer with the wheels below said cut-out portions, said hull having a cabin thereon having a front wall, a rear wall, and side walls, a roof positioned above said walls forming a roof for the cabin and forming a roof deck, said roof deck having a guard rail along at least two of its edges, at least one of said walls having a ladder secured in spaced relation thereto to provide access to and from said roof deck, said hull having a trailer attachment at its forward portion and means for attaching an outboard motor at its rear.

2. The vehicle set forth in claim 1 wherein said hull has a forward deck and a rear deck, said forward deck supporting the lower portion of said ladder extending to said roof deck, and said rear deck of said hull being adapted to receive an outboard motor.

3. The vehicle set forth in claim 1 wherein said roof deck has a guard rail which may be raised into guarding position and lowered substantially into said cabin for traveling when said roof deck is not in use.

4. The vehicle set forth in claim 1 wherein pontoons are removably secured to said roof deck for storage and travelling and are adapted to be secured to said hull along the sides thereof, said pontoons having a side deck thereabove, thereby forming a continuous circumscribing deck extending completely around the walls of said cabin.

5. The vehicle set forth in claim 1 wherein said cabin has a steering wheel therein adapted to be connected with said outboard motor, so that said vehicle may be steered in water by said steering wheel.

6. The vehicle set forth in claim 1 wherein the wheels of said trailer are positioned substantially mid-way between the front and rear of said land-water vehicle, so that said vehicle will be substantially in balance on said wheels when the trailer is not secured to a prime mover.

7. The vehicle set forth in claim 1 wherein said hull has means for removably securing said trailer to said hull and for removably securing pontoons to said hull.

8. The device set forth in claim 1 wherein said means in said hull is adapted to receive T-shaped bolts.

9. The device set forth in claim 1 wherein said front wall is provided with a slight rearward slope and a sliding door which slides inwardly of said front wall, said sliding door having a curved upper portion to permit easier access to the cabin, said sliding door moving parallel to said front wall at all times in moving from a fully closed to a fully open position.

10. The device set forth in claim 1 wherein poles mounted on the hull form substantially all of the support for the roof deck and wherein the side walls are positioned at the full width of the device.

References Cited

UNITED STATES PATENTS

| | | | |
|---|---|---|---|
| 2,956,836 | 10/1960 | James et al. | 49—36 |
| 2,992,444 | 7/1961 | Schuler | 9—1 |
| 3,091,208 | 5/1963 | Copeland et al. | 280—414 X |
| 3,114,157 | 12/1963 | Stockmann | 9—1 X |
| 3,134,991 | 6/1964 | Levinson | 9—1 |
| 3,203,438 | 8/1965 | Watts et al. | 9—1 X |

MILTON BUCHLER, *Primary Examiner.*

FERGUS S. MIDDLETON, *Examiner.*

T. M. BLIX, *Assistant Examiner.*